UNITED STATES PATENT OFFICE.

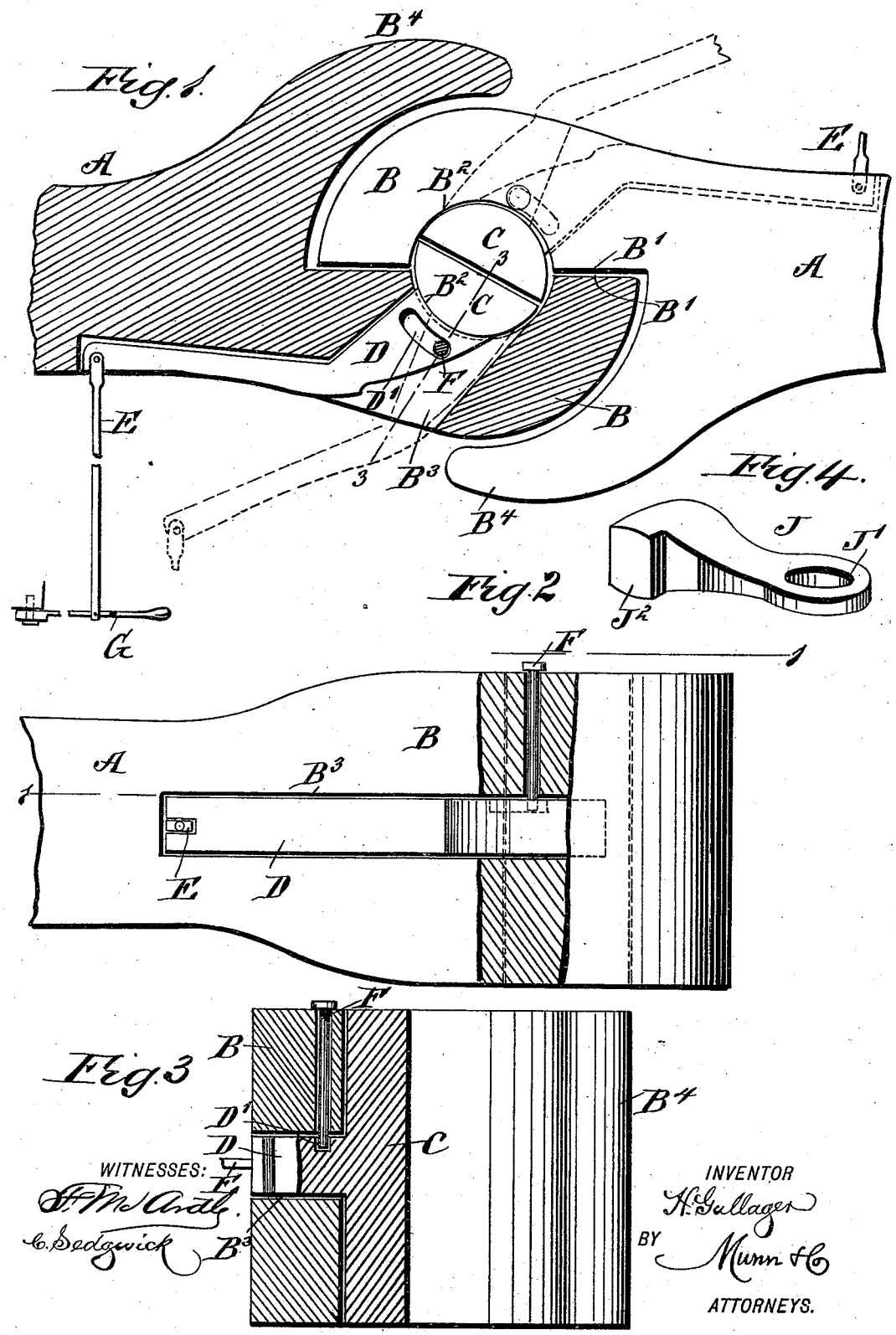

HENRY GALLAGER, OF SAVANNAH, GEORGIA.

CAR-COUPLING.

SPECIFICATION forming part of Letters Patent No. 488,885, dated December 27, 1892.

Application filed October 6, 1892. Serial No. 448,035. (No model.)

*To all whom it may concern:*

Be it known that I, HENRY GALLAGER, of Savannah, in the county of Chatham and State of Georgia, have invented a new and Improved Car-Coupler, of which the following is a full, clear, and exact description.

The object of the invention is to provide a new and improved car coupler, which is simple and durable in construction, very effective and automatic in operation, and arranged to couple or uncouple the cars without the operator stepping between the cars.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a sectional plan view of the improvement on the line 1—1 of Fig. 2; Fig. 2 is a side elevation of the same with parts broken out; Fig. 3 is a transverse section of same on the line 3—3 of Fig. 1; and Fig. 4 is a perspective view of a link to be used in connection with an ordinary link and pin coupling.

The drawhead A, is provided at its forward end with a head B, having an inner face B' extending longitudinally and formed at or near its middle with a semi-circular recess B², into which fits a half bolt C, adapted to be moved with its straight face in line with the face B' and also adapted to be turned in the recess B² so as to assume an angular position to engage, with one projecting corner, a corresponding recess B² in the face B' of the other drawhead. The bolt C is provided at or near its middle and on its half round side with an outwardly extending arm D, passing through a slot B³ formed in the head B and leading from the outside to the recess B². The arm D is connected at its free end with a rod E, extending transversely to the side of the car so as to be taken hold of by the operator without the latter stepping between the cars. The turning motion of the bolt C is limited by means of a pin F, secured on the head B and passing into a segmental recess D' in the arm D, as shown in the drawings. The head B is preferably rounded as shown in Fig. 1, and is adapted to engage an offset B⁴, formed on the other drawhead A, so as to prevent lateral displacement of the drawheads.

The operation is as follows: When the cars are coupled as shown in Fig. 1, the two bolts C of the drawheads engage with their corners the opposite recesses B² it being understood that the straight faces of the two bolts abut one on the other, as shown. The rod E is held in the normal position by a spring G held on the side of the car and connected with the outer end of rod E. Now, when it is desired to uncouple the cars, the operator pulls on either of the rods E so that the respective arm D swings outward, and the bolts C are turned simultaneously in their bearings in the recesses B² until the straight faces of the said bolts are in alignment with the faces B' of the heads B. When the two cars are now drawn apart, the faces B' of the heads B, as well as those of the bolts C will readily pass each other, and the drawheads will separate. As soon as the operator releases the pull on the rod E, the bolts C return to their normal angular position, by the action of the springs G on the rods E. When the drawheads are in this position, the two cars can be moved toward each other for coupling and the head B of one drawhead will pass into the head of the other drawhead, and at the same time the bolts will be slightly turned until their faces are in alignment with the faces B' of the heads until the said heads are in full contact with each other so that the bolts again assume their angular position and the bolt of one drawhead engages with its projecting outer corner of the recess of the opposite drawhead. If it is desired to couple a drawhead A with a car having an ordinary drawhead of the pin and link style, then I prefer a link J shown in Fig. 4, the said link having an eye J' for engagement with the pin in the ordinary drawhead and also provided with a hook J² for engagement with the recess B² in the head B of the drawhead A.

Having thus fully described my invention, I claim as new and desire to secure by Letters Patent,—

1. A car coupler comprising a drawhead having a head formed with an inner longitudinally-extending face containing a vertically-disposed semi-circular recess, a half-bolt mounted to turn in the said recess, an arm connected with the said bolt, and a pin connected with the said arm, substantially as shown and described.

2. A car coupler comprising a drawhead having a head formed with an inner longitudinally-extending face containing a vertically-disposed semi-circular recess, a half-bolt mounted to turn in the said recess, an arm connected with the said bolt, a pin connected with the said arm, and a rod connected with the said arm and reaching to one side of the car, substantially as shown and described.

3. A car coupler comprising a drawhead having a head formed with an inner longitudinally-extending face containing a vertically-disposed semi-circular recess, a half-bolt mounted to turn in the said recess, an arm connected with the said bolt, a pin connected with said arm, and means, substantially as described, for locking the said arm in place, as set forth.

HENRY GALLAGER.

Witnesses:
R. S. MELL,
WM. Y. COOPER.